Dec. 4, 1951     G. M. PORTER     2,577,091

COVERING BOX DUMPER

Filed Jan. 15, 1949     7 Sheets-Sheet 1

GLENN M. PORTER
INVENTOR.

BY

ATTORNEY

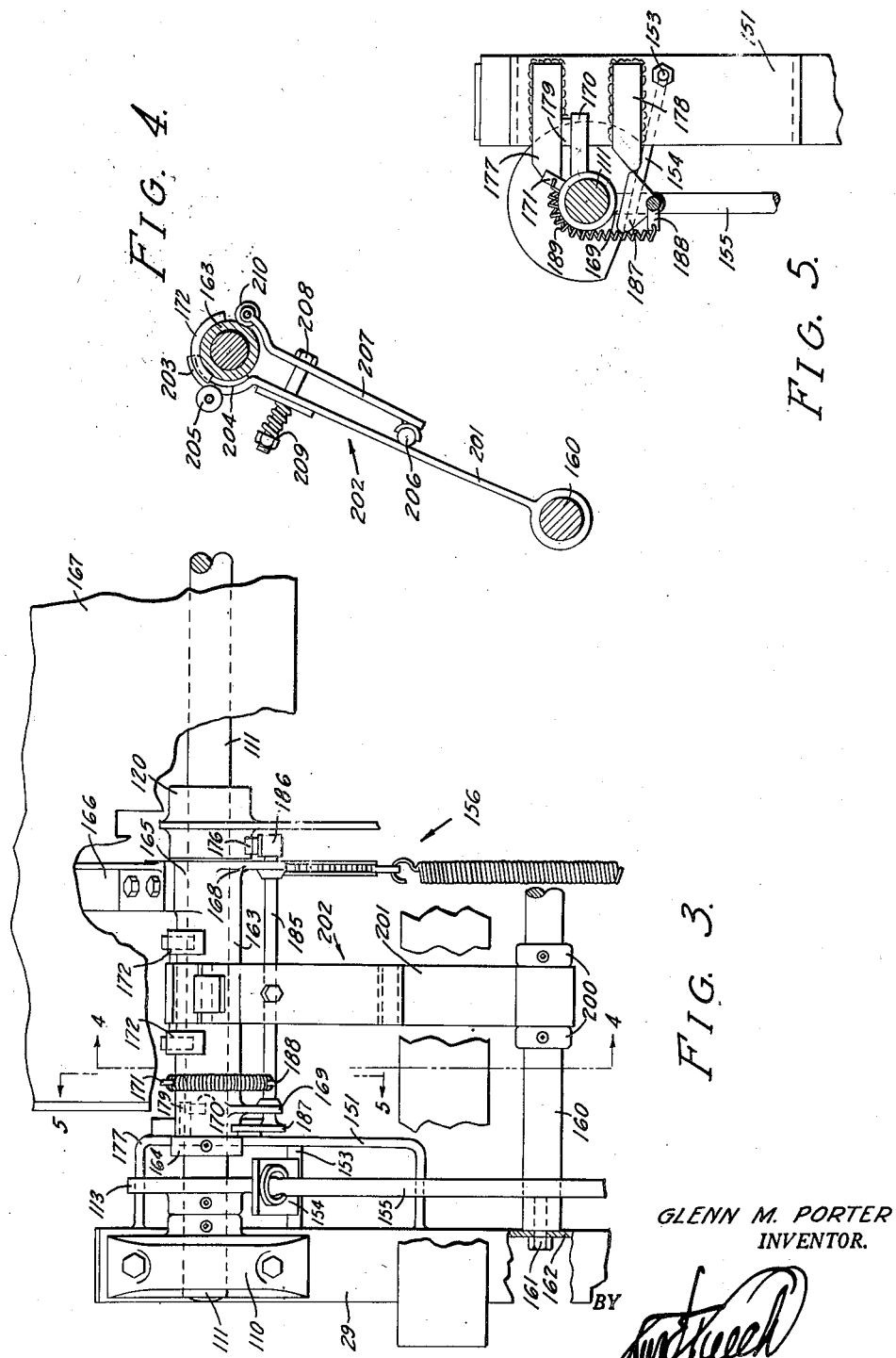

Dec. 4, 1951  G. M. PORTER  2,577,091
COVERING BOX DUMPER

Filed Jan. 15, 1949  7 Sheets-Sheet 3

GLENN M. PORTER
INVENTOR.

BY

ATTORNEY

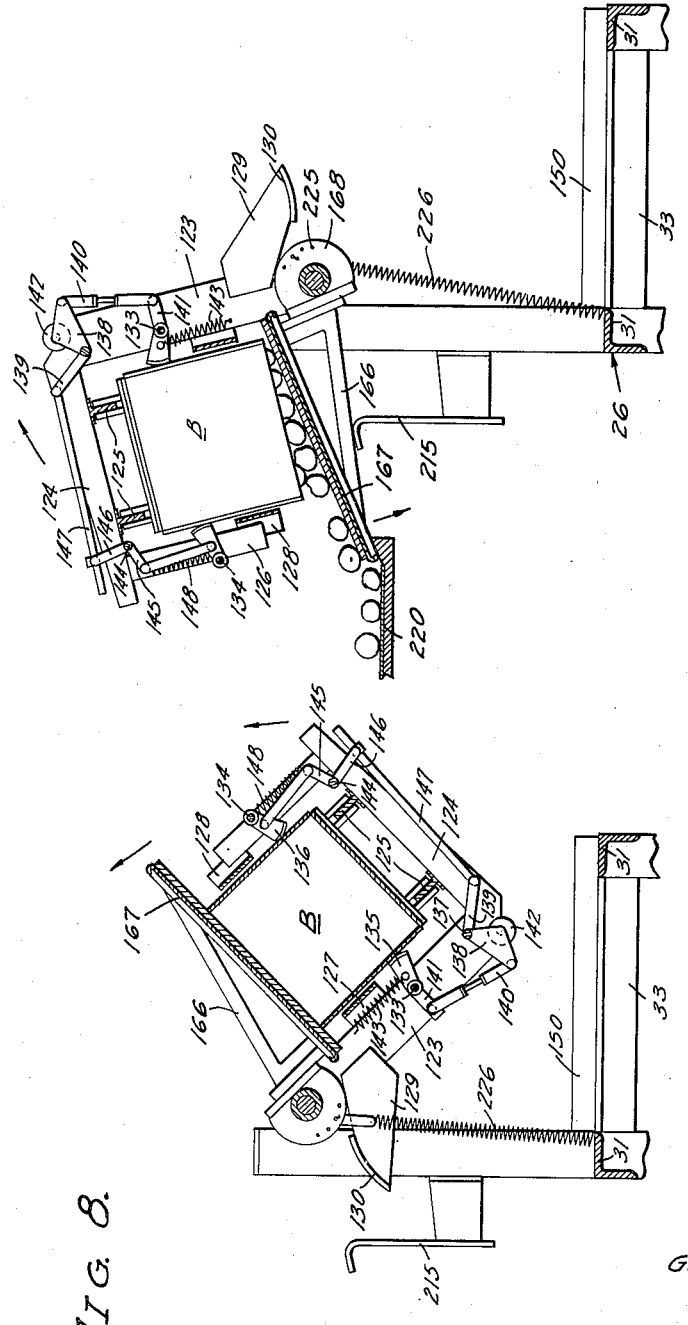

Dec. 4, 1951  G. M. PORTER  2,577,091
COVERING BOX DUMPER
Filed Jan. 15, 1949  7 Sheets-Sheet 5

GLENN M. PORTER
INVENTOR.

BY

ATTORNEY

Dec. 4, 1951      G. M. PORTER      2,577,091
COVERING BOX DUMPER
Filed Jan. 15, 1949      7 Sheets-Sheet 6
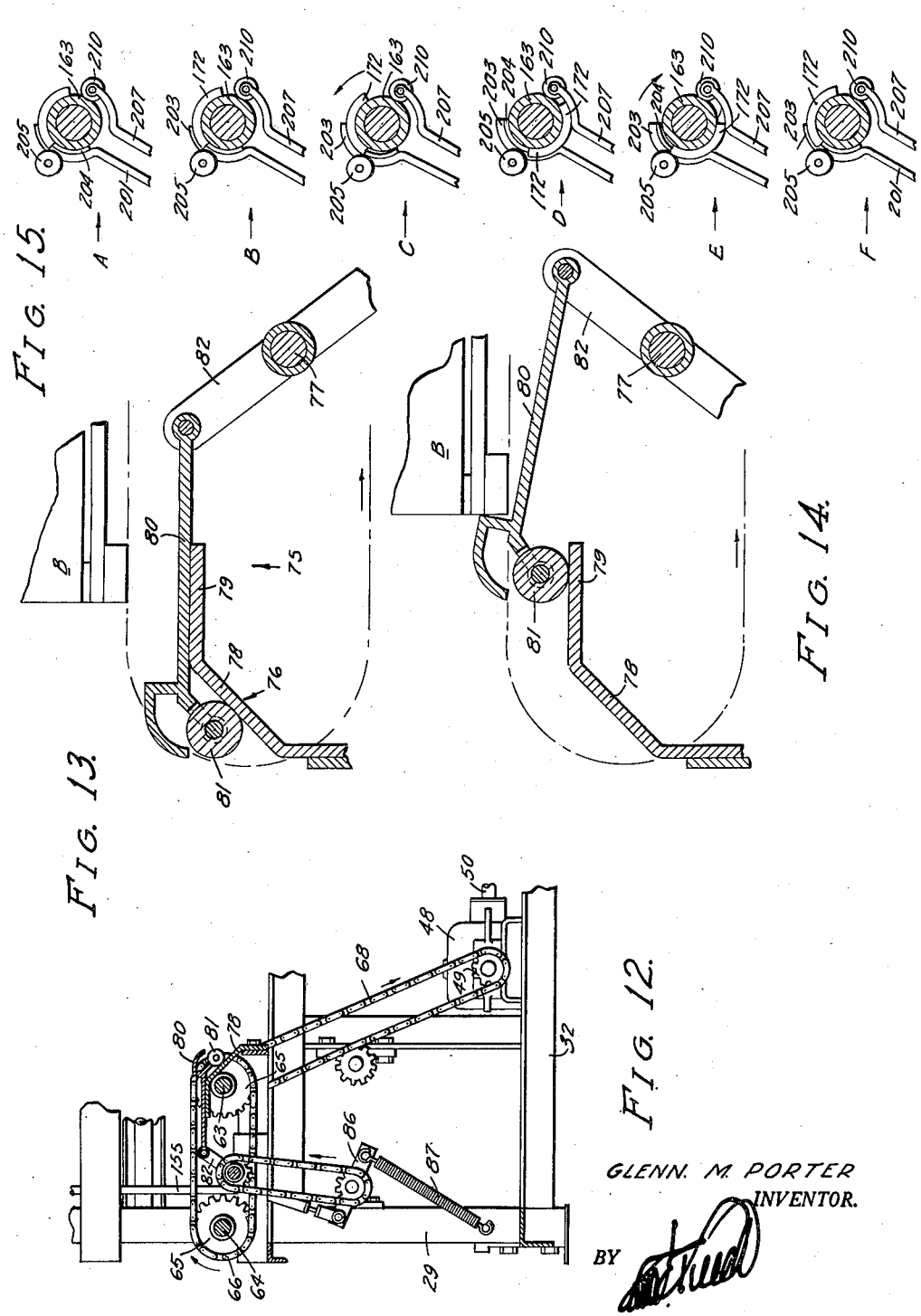
GLENN M. PORTER
INVENTOR.
BY
ATTORNEY Dec. 4, 1951  G. M. PORTER  2,577,091
COVERING BOX DUMPER
Filed Jan. 15, 1949  7 Sheets-Sheet 7
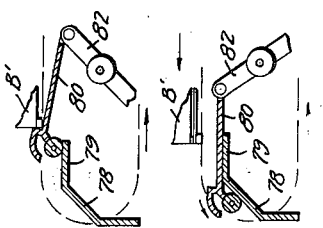
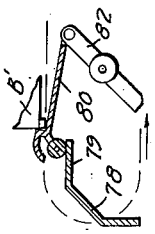
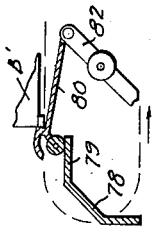
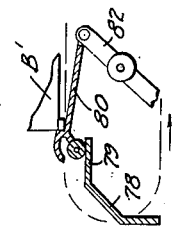
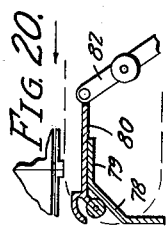
FIG. 20.
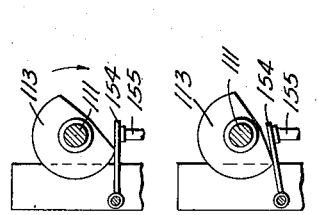
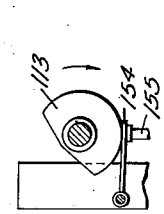
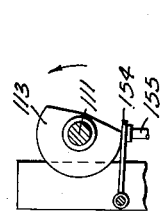
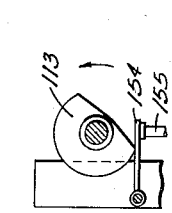
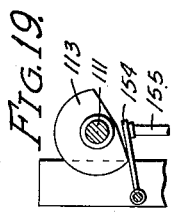
FIG. 19.
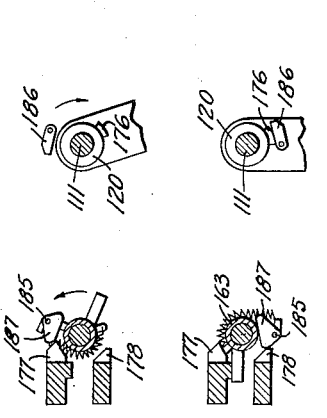
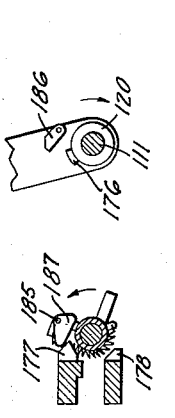
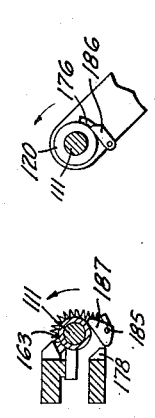
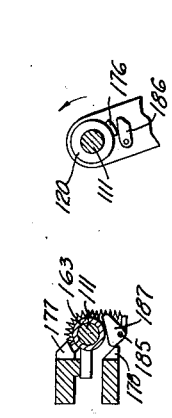
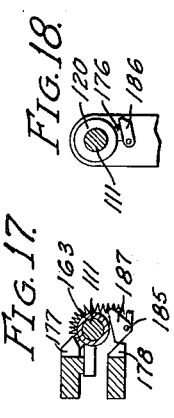
FIG. 18.   FIG. 17.
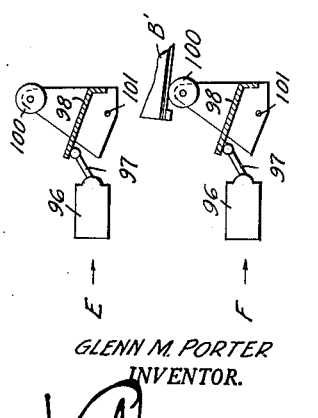
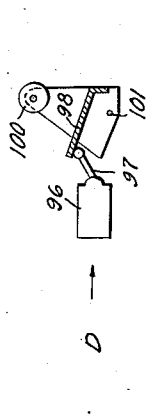
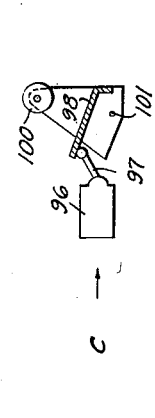
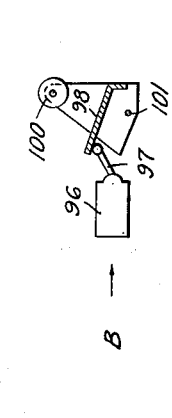
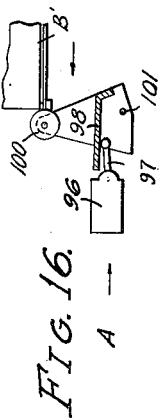
FIG. 16.
A  B  C  D  E  F
GLENN M. PORTER
INVENTOR.
BY
ATTORNEY Patented Dec. 4, 1951

2,577,091

UNITED STATES PATENT OFFICE 2,577,091

COVERING BOX DUMPER

Glenn M. Porter, Riverside, Calif., assignor to Food Machinery and Chemical Corporation, San Jose, Calif., a corporation of Delaware Application January 15, 1949, Serial No. 71,110

3 Claims. (Cl. 214—1.1)

This invention relates to equipment for dumping loose material from open boxes containing the same, and is particularly useful in packing houses, canneries and the like.

It is an object of this invention to provide a novel and efficient box dumper which is adapted to receive boxes from a conveyor on which said boxes are arranged in a line and successively invert and dump the contents from said boxes.

It is another object of the invention to provide a novel and efficient box dumper in which a cover is automatically applied to each of said open boxes while it is being inverted.

It is a further object to provide such a dumper in which the cover applied to the box while it is being dumped is employed as a delivery board inclined downwardly whereby the fruit or other product contained in the box rolls from said cover after being dumped thereon from said box, in which a device is provided for holding said cover in said inclined position for a sufficient interval for all the fruit to gravitate therefrom, and in which a mechanism is provided for then rapidly returning said cover to starting position.

It is a still further object of the invention to provide such a dumper having incorporated therein a means for feeding boxes to the dumping mechanism with the boxes traveling horizontally parallel to their longitudinal axis in single file and means for discharging the empty boxes after the contents have been dumped therefrom at the opposite end of the machine, in which the feeding and discharge mechanisms are interchangeable to prepare the machine for receiving boxes either from the right end or the left end thereof.

Another object of the invention is to provide such a box dumper which covers the box and inverts it while covered to dump the contents from the box which is adapted for being readily altered in order for it to accommodate boxes differing substantially in size.

The manner of accomplishing the foregoing objects, as well as further objects and advantages, will be made manifest in the following description taken in connection with the accompanying drawings in which:

Fig. 3 is an enlarged fragmentary view of a portion of Fig. 2 illustrating the left unit of the cover control mechanism.

Fig. 4 is a sectional view taken on the line 4—4 of Fig. 3 and shows the left cover brake.

Fig. 5 is a sectional view taken on the line 5—5 of Fig. 3 and shows the left cover lock control device.

Fig. 8 is a view similar to Fig. 7 and illustrates said cradle and box just after said box has been swung upwardly into contact with the box cover of the dumper.

Fig. 9 is a view similar to Fig. 8 and illustrates said cradle at the extremity of its box inverting travel at the moment it starts to return, which is also the moment that said cover is released from locked relation with said box, and falls downwardly a short distance against a supporting rest.

Fig. 12 is a fragmentary diagrammatic sectional view taken on the line 12—12 of Fig. 1 and illustrates a modification of the feeding mechanism of the invention whereby the latter is placed at the left end of the machine to feed boxes into the machine from the left.

Fig. 13 is an enlarged diagrammatic view taken on the line 12—12 of Fig. 1 and illustrating the normal condition of the box feeding mechanism of the invention when it is located at the right end of the machine in between box dumping cycles of the machine.

Fig. 14 is a view similar to Fig. 13 illustrating the manner in which the box feeding mechanism is actuated at the start of a box inverting cycle of the machine to withdraw the next box in line rearwardly out of close proximity to the box being dumped to prevent a collision between these two boxes during the dumping cycle.

Fig. 15 is a series of diagrammatic cross-sectional views taken on the line 15—15 of Fig. 2 illustrating successive conditions of the left cover brake of the invention in each of six different points of time in a box dumping cycle of the invention. Said conditions in said respective points of time may be distinguished by the capital letters A, B, C, D, E and F.

Figure 1:
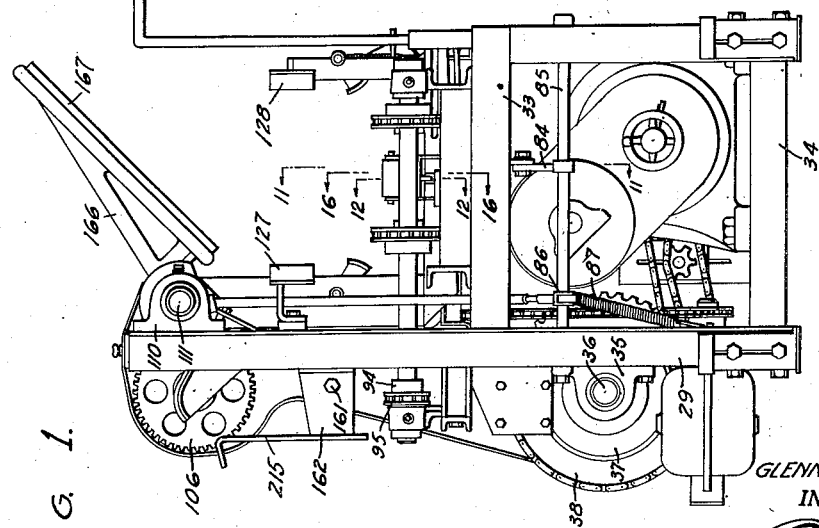
Fig. 1 is a left end elevation of a preferred embodiment of the invention.

Fig. 16 is a series of diagrammatic sectional views taken on the line 16—16 of Fig. 1 and illustrating the condition of the box stop and clutch actuating switch at each of the six points of time aforesaid.

Figure 2:
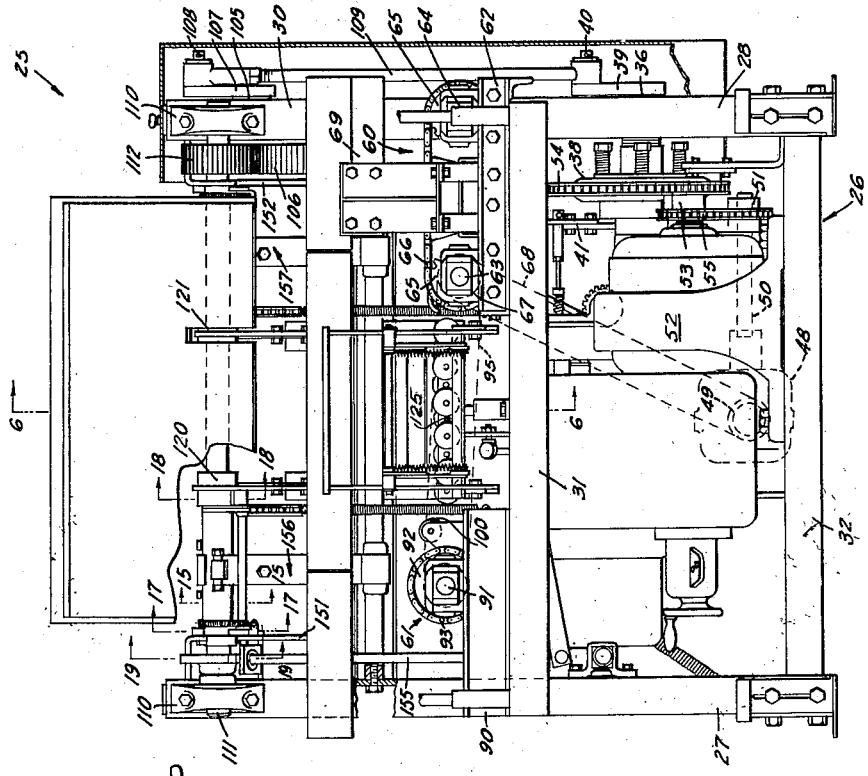
Fig. 2 is a front elevation of Fig. 1.

Fig. 17 is a series of diagrammatic cross-sectional views taken on the line 17—17 of Fig. 2 and illustrating the condition of the left cover lock control cam at each of the six points of time aforesaid of a box dumping cycle.

Fig. 18 is a series of diagrammatic cross-sectional views taken on the line 18—18 of Fig. 2 and illustrating the condition of the left cover lock of the invention at each of the six points of time aforesaid of a box dumping cycle.

Fig. 19 is a series of diagrammatic cross-sectional views taken on the line 19—19 of Fig. 2 and illustrating the actuating cam of the box withdrawing device of the feeder of the invention at each of the six points of time aforesaid of a box dumping cycle.

Fig. 20 is a series of diagrammatic cross-sectional views taken on the line 16—16 of Fig. 1 and illustrating the condition of the box withdrawing device of the feed mechanism of the invention at each of the six points of time aforesaid in a box dumping cycle.

Referring specifically to the drawings, my invention as shown therein is embodied in a box dumper 25 having a structural steel frame 26, the latter including front corner posts 27 and 28, rear corner posts 29 and 30, horizontal members 31 and 32 which connect the front corner posts 27 and 28, and end horizontal members 33 and 34 which connect the front corner posts 27 and 28 with rear corner posts 29 and 30.

Figure 11:
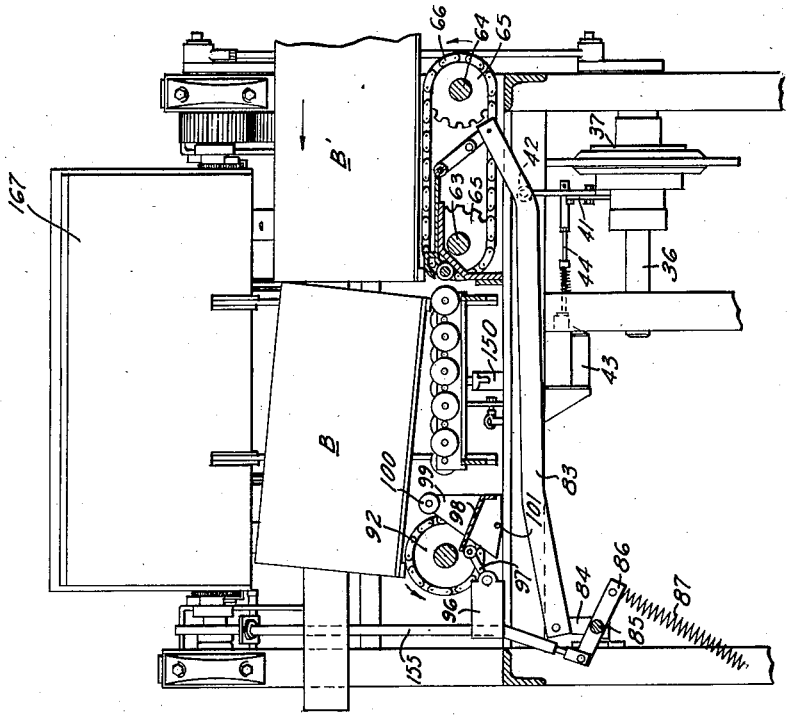
Fig. 11 is a diagrammatic fragmentary longitudinal vertical sectional view taken on the line 11—11 of Fig. 1, and illustrates the invention feeding a filled box into the dumper and simultaneously discharging an empty box therefrom.

Journalling in bearings 35 provided on the frame 26 is a clutch shaft 36 carrying a clutch 37 on which is provided a master sprocket 38 and on the outer end of which is fixed a crank 39 having a crank pin 40. The clutch 37 is controlled by a clutch arm 41 which is pivoted at 42 on the frame 26 (Fig. 11). Also mounted on the frame 26 is a solenoid 43 the armature of which is connected by a rod 44 to the clutch arm 41. In its normal position in which it is shown in Figs. 2 and 11, the clutch arm 41 maintains the clutch inoperative, but when the solenoid 43 is energized, the arm 41 is swung to momentarily throw in the clutch and cause it to rotate the shaft 36 a single revolution.

Also mounted on the frame 26 is a gear box 48, this having a sprocket 49 and a shaft 50 on which is provided a sprocket 51.

Also mounted on the frame 26 is a variable speed geared motor 52 which is connected by an endless chain 54 with the clutch sprocket 38 and by an endless chain 55 with the gear box sprocket 51.

Mounted on the members 31 and 33 at opposite ends of the machine is a box feed unit 60 and an empty box discharge unit 61. The unit 60 includes a base 62 on which are journalled shafts 63 and 64 carrying sprockets 65 about which are trained chains 66, the rearwardly extending end of the shaft 63 also having a double sprocket 67 which is connected by a chain 68 to the gear box sprocket 49, whereby the shafts 63 and 64 of the unit 60 are constantly rotated in a direction to feed boxes into the machine 25. Extending upwardly from the base 62 is a front box guide 69.

The feed unit 60 also includes a box retractor 75 including a cam track 76 and shaft 77 which are fixed on the base 62, the cam track having an inclined portion 78 and a horizontal portion 79. A hook 80 normally rests on the horizontal track portion 79 and has a cam following roller 81 which normally rests on the inclined portion 78. Pivoted on the shaft 77, and having its upper end pivotally connected to the hook 80 is a lever 82. The lower end of this lever is pivotally connected to a link 83 (Fig. 11), the opposite end of which is pivotally connected to an arm 84 fixed on a shaft 85 which is journalled in suitable bearings provided on the posts 27 and 29. The shaft also has connected thereto a lever 86 the inner end of which is connected by a spring 87 to the frame so as to spring-urge the hook 80 into its normal position shown in Fig. 13.

The empty box ejector unit 61 includes a base 90, having bearings, in which is journalled a shaft 91 on which are fixed sprockets 92 having chains 93 which merely encircle these sprockets and provide wear surfaces therefor. The shaft 91 also has a sprocket 94 which is connected by a chain 95 to the double sprocket on the rear end of the shaft 63 so that during the operation of the machine 25 the shaft 91 and sprockets 92 are continually rotated in a direction to eject an empty box from the machine when the latter is fed onto these sprockets.

Provided on the base 90 is a solenoid control switch 96 having an upwardly spring-urged arm 97 the end of which is provided with a roller on which a plate 98 of a box stop 99 rests, said stop having a roller 100 and being pivoted at 101 on the base 90. The switch 96 is connected in the circuit of the solenoid 43 so that normally the solenoid is not energized, but upon depressing the arm 97 the solenoid is momentarily energized to throw in the clutch 37 to cause a single revolution of the shaft 36.

Journalled in a suitable bearing provided on the rear of the upper end of the post 30 is a counter crank shaft 105 having a gear 106 fixed on the inner end thereof, and a crank 107 fixed on the outer end thereof, the latter having a crank pin 108. Connecting the crank pins 40 and 108 is a pitman 109, the length of the crank 107 being such that when the shaft 36 makes a complete revolution beginning and ending with the position shown for this crank in Fig. 2, the shaft 105 is merely rocked by the crank 107.

Journalled at its opposite ends in bearings 110 provided on the front of upper ends of the corner posts 29 and 30 is a cradle and cover mounting shaft 111. Fixed on this shaft and meshing with the gear 106 is a smaller gear 112.

Also fixed on the shaft 111 is a box retractor actuating cam 113 and a pair of cradle hubs 120 and 121. These hubs carry a box inverting cradle 122 including normally vertical arms 123 which are welded to the hubs 120 and 121 on the lower ends of which are fixed forwardly extending supports 124 on which are adjustably mounted a pair of roller conveyor sections 125. Adjustably provided on the outer end portions of the members 124 are uprights 126. Provided on the arms 123 and uprights 126 are box guides 127 and 128. Adjustably fixed on the arms 123 and extending rearwardly therefrom are cover kickers 129, the upper extremities of these being shod by brake lining 130.

Fixed on shafts 133 and 134, which are journalled between arms 123 and uprights 126 respectively, are box gripping jaws 135 and 136. Also journalled on the arms 123 is a shaft 137 having arms 138 and 139. The arm 138 is connected by an adjustable link 140 to an arm 141 provided on the shaft 133. The link 138 has a cam following roller 142. The jaw 135 is connected to one of the arms 123 by a spring 143 which spring-urges this jaw upwardly.

Figure 6:
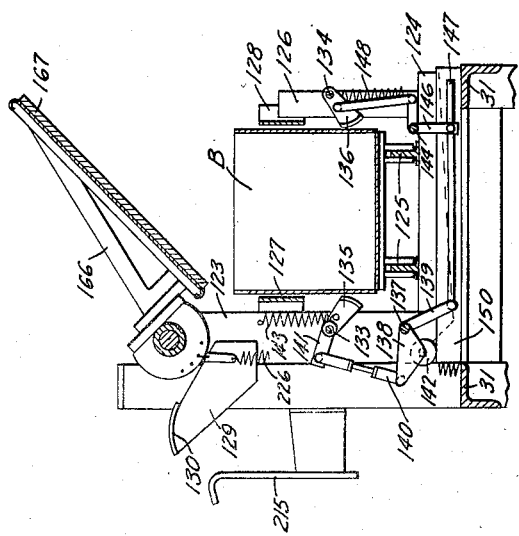
Fig. 6 is a diagrammatic fragmentary sectional view taken on the line 6—6 of Fig. 2 and illustrates a box positioned in the cradle of my invention in readiness to commence a dumping operation.

Supported on the horizontal members 31 is a horizontal cam track 150 on which the roller 142 rests when the cradle 122 is in its starting position as shown in Fig. 6, this contact rotating the shafts 133, 134 and 137 to swing the jaws 135 and 136 downwardly out of gripping relation with a box B when the latter is positioned as shown in this figure. Whenever the cradle 122 is swung forwardly, however, to remove the rollers 142 from contact with the track 150, the jaws 135 and 136 are swung forwardly by the springs 143 and 148 into gripping relation with the box B.

Fixed on upper end portions of the posts 29 and 30, and extending inwardly therefrom, are rectangular shaped brackets 151 and 152. Pivotally mounted between the post 29 and bracket 151 is a shaft 153 carrying a cam following arm 154, this arm being connected by a rod 155 to the outer end of the lever 86 (Figs. 3, 5, and 11).

Provided at opposite ends of the machine 25 are cover mounting and control mechanisms 156 and 157 which are reverse duplicates of each other so that a description of the left mechanism 156 will suffice for both. Reference to detail features of the right mechanism 157, however, may be made by use of the same numbers as are employed in describing corresponding details of the left mechanism 156 with prime attached.

The cover mounting and control mechanisms 156 and 157 include a shaft 160, opposite ends of which are secured by cap screws 161 to brackets 162 fixed upon and extending rearwardly from posts 29 and 30. The mechanism 156 has a sleeve 163 which is freely rotatable on the shaft 111 and is disposed between the cradle hub 120 and a collar 164 fixed on said shaft. This sleeve has a boss 165 on which an arm 166 of a box cover 167 is secured. Said sleeve also has welded thereon and projecting therefrom a spring mounting and bearing flange 168, a bearing ear 169, a stop arm 170 (Fig. 5), a spring fastening lug 171, and a pair of brake control cams 172.

The hub 120 also has a latch lug 176 welded thereon (Figs. 3 and 18).

Welded on the bracket 151 are latch cam control dogs 177 and 178 and a cover stop 179 (Fig. 5).

Journalled in aligned bearings provided in the flange 168 and ear 169 is a shaft 185 having a lock 186 welded on one end thereof, a control cam 187 welded on the opposite end thereof, and a spring lug 188 which is also welded on said shaft and extends horizontally therefrom. Connecting the lugs 171 and 188 is a coil spring 189.

Mounted on the shaft 160 between a pair of collars 200, is an arm 201 of a cover brake 202. The upper end of this arm has an arcuate portion 203 which is lined with brake lining 204 which when brought against the sleeve 163 is concentric therewith and conforms to the outer surface of the sleeve. Pivotally mounted on said arcuate portion 203 is a pair of rollers 205 which are aligned with the brake control cams 172. Pivoted to the arm 201 at 206 is a cooperating arm 207, there being a bolt 208 extending through said arms carrying a spring 209 which spring-urges said arms together. Rotatably mounted on the upper end of the arm 207 is a roller 210 which constantly bears against the sleeve 163.

The brake control cams 172 are of sufficient thickness that when the sleeve 163 is rotated to bring these cams under the rollers 205, the latter are raised to lift the brake lining 204 out of contact with the sleeve 163.

*Operation*

The dumper 25 of my invention operates in the following manner:

Open topped boxes containing vegetables or fruit, which it is desired to dump from these, are fed along a suitable conveyor (not shown) onto the feeder 60 which propels these rapidly over the roller conveyor sections 125 of the cradle 122, and into contact with the roller 100 of the box stop 99.

This depresses the arm 97 of the switch 96 energizing the solenoid 43 and initiating a single revolution of the clutch 37. The rotation of this clutch rocks the shaft 111 through substantially an angle of 105° from the position in which it is shown in Figs. 1 and 6 and then returns this shaft to said position.

At the start of this dumping cycle the elements of the apparatus shown in Figs. 15, 16, 17, 18, 19 and 20 are conditioned as shown in the uppermost diagrams of these respective figures. The point of time (A) illustrated in these uppermost views is at the instant the box actuates the switch 96. In Fig. 17 it will be noted that at point (A) the cam 187 is in engagement with the dog 178 thereby rotating the shaft 185 and swinging the lock 186 downwardly out of the way of the lug 176 on the cradle hub 120. At this point rotation of the shaft 111 has not yet started and the cam 113 and hook 80 are in their starting positions as shown in Figs. 19 and 20.

Point of time (B) illustrated in the second set of diagrams in Figs. 15 to 20 inclusive follows an interval during which the shaft 111 has been swung a sufficient distance to rotate cam 113 and operate the hook 80 to retract a next-to-the-foremost box B' in the opposite direction from that in which it travels on the feeder 60.

Figure 7:
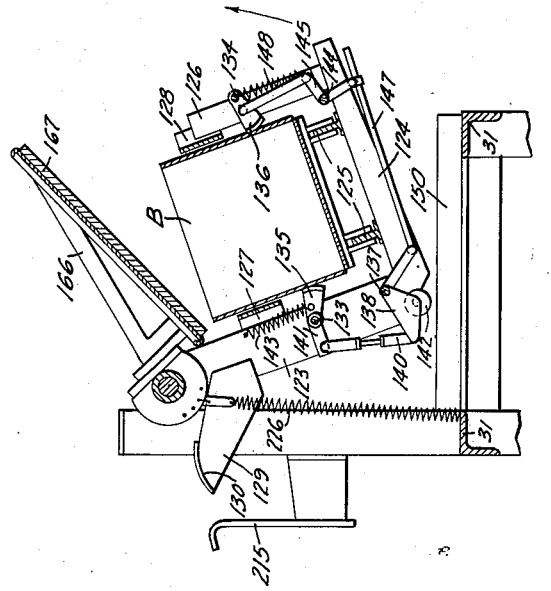
Fig. 7 illustrates the dumping cradle of the invention swinging upwardly with the box gripping mechanism actuated to grip said box and hold it in place on said cradle during the inversion of said box by said cradle.

As before noted and as shown in Fig. 7 the box gripping jaws 135 and 136 have been here swung upwardly into gripping relation with box B. The box, however, has still not contacted the cover 167 which occurs at point of time (C) illustrated in the third series of diagrams in Figs. 15 to 20 inclusive, and also illustrated in Fig. 8.

It is to be noted in Figs. 17 and 18 that at point of time (C) the initial rotation of the sleeve 163 removes the control cam 187 from contact with the dog 178 so as to permit the lock 186 to swing upwardly behind the dog 176 on the cradle hub 120 thereby locking the cover 167 in covering relation with box B as shown in Fig. 8 through the balance of the box inverting movement of the dumping cycle.

This movement terminates at point of time (D) as shown in Fig. 9 and as illustrated in the fourth series of diagrams of Figs. 15 to 20 inclusive. Here it is shown in Figs. 17 and 18 that the control cam 187 has been brought into engagement with the upper cam surface of the dog 177 thereby rotating the shaft 185 and withdrawing the lock 186 from behind the lug 176 thus releasing the cover 167 and allowing it to drop a short distance downwardly until it comes to rest on a support 215 causing the cover to be inclined steeply downwardly.

At point of time (D) the brake control cams 172 on the sleeve 163 rotate out of supporting relation with the rollers 205 whereby the brake 202 is rendered operative to hold the cover 167 in its downwardly inclined position until this is positively swung upwardly away from that position. The cover is thus held in this position for an ample period to allow all the fruit to gravitate therefrom onto a conveyor 220 which is located in a position immediately therebelow so that the fruit rolls easily from the cover onto the conveyor.

The period allowed in a dumping cycle 67 for the cover to be thus cleared of fruit is ample by reason of the fact that the cradle returns almost to its initial position before this position of the cover is disturbed.

Figure 10:
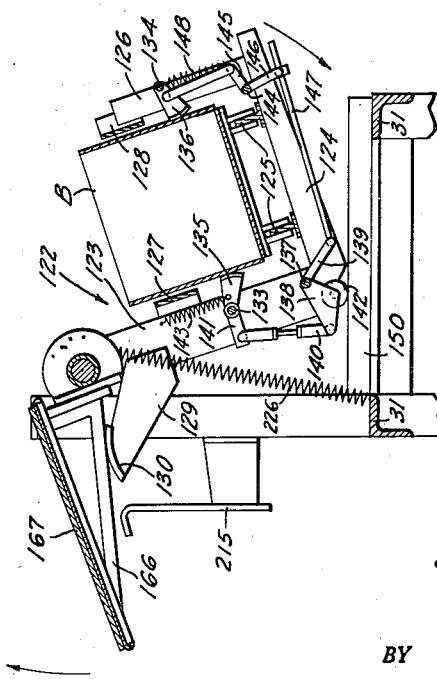
Fig. 10 is a view similar to Fig. 9 but illustrating the box dumping cradle approaching the end of its return movement at the moment when cover kickers on the cradle kick the cover upwardly to start it in its return to its starting position in which it is shown in Fig. 6.

This interval allowed for the discharge of fruit from the cover 167 terminates at point of time (E) which is the instant shown in Fig. 10 at which the cradle 122 is swung back towards its initial position sufficiently to bring the shoes 130 of the cover kicker 129 into contact with the arms 166 of the cover 167 so as to impart a rapidly accelerating upward swinging movement to the cover. This kicking of the cover 167 swings this and the sleeve 163 on which it is secured in a reverse direction a sufficient distance while the kickers are still in contact with the cover to bring the cam lugs 172 under the rollers 205 as shown in the fifth diagram in Fig. 15, which releases the brakes 202 and 202', so that the cover is practically unretarded and continues to swing rapidly back towards the initial position in which it is shown in Fig. 6.

As it approaches this position, the lugs 172 ride out from under the rollers 205 and the brakes 202 and 202' are set to decelerate the rotation of the cover just as the stop arms 170 and 170' come into contact with the stops 179 and 179'.

As the box B is elevated in its dumping cycle out of contact with the roller 100, the spring actuating the switch arm 97 returns the box stop 99 to its initial position shown in Fig. 11 in which it is underneath the front end of the box B.

As arrival of the point of time (F) in the cycle of operation returns the cam 113 to its original position permitting the arm 154 to rise and shift the hook 80 forwardly as shown in the fifth diagram of Fig. 20, the box B", which is next in line for delivery to the cradle 122, is free to be propelled forwardly by the feeder 60, box B' thus forcing empty box B onto the box ejector sprockets 92 the rotation of which results in the rapid ejection of the empty box B from the dumper 25 onto a suitable conveyor (not shown) and which is disposed to receive the empties.

As the empty box B is thus ejected box B' is fed onto the cradle 122 and against the positioning stop 99 which halts this box in the proper position on the cradle and actuates a second dumping cycle in which box B' has its contents dumped therefrom onto the conveyor 22 in exactly the same manner as hereinabove described for the dumping of box B.

As shown in Fig. 9, the flange 168 is provided with a series of holes 225 for connecting the upper end of a coil spring thereto, the lower end of this spring being connected to the frame 26 of the machine whereby springs 226 and 226' assist in the reverse swinging of the cover 167 to its initial position after the cover has been set in motion relatively rapidly and started on its return movement by its being kicked by the kickers 129. The springs 226 are insufficient to overcome the retarding action of the brakes 202 and 202' as these are set at point of time (D) during the interval that the fruit is free to gravitate the rearwardly and downwardly inclined cover. These springs, however, are effective in preventing too rapid deceleration of the returning movement of the cover 167, which is imparted to it by the kickers 129.

I claim:

1. In a box dumper, the combination of: a box inverting cradle pivoted on a horizontal axis; a box cover pivoted on the same axis and swingable between initial and end positions; brake means operative to frictionally resist rotation of said cover while said cover is in either of said positions but relatively inoperative to hinder rotation of said cover in a substantial arc of swinging movement between said positions; means responsive to delivery of a box to said cradle to swing said cradle to invert said box and then return said cradle to its starting position; grippers to retain said box in said cradle while said box is inverted; said cover in its initial position being engaged by said box to cover the latter; lock means responsive to movement of said cradle to lock said cover in closing relation to said box; means responsive to movement of said cradle at the substantial completion of the inversion of said box to release said lock means, thereby swinging said cover to its end position and leaving it there while said cradle is returning to its starting position, thereby dumping the contents from said box onto said cover; and means responsive to said cradle closely approaching its starting position for imparting a rapid swinging acceleration to said cover, returning the same from its end position to its initial position.

2. A combination as in claim 1 in which the means for accomplishing the return of the cover to its initial position comprises a kicker provided on said cradle which delivers a kick to said cover just before said cradle returns to its starting position, to accomplish the return of said cover to its initial position, said cover being halted in the latter by said brake means.

3. A combination as in claim 1 in which the means for accomplishing the return of the cover to its initial position comprises a kicker provided on said cradle which delivers a kick to said cover just before said cradle returns to its starting position, to accomplish the return of said cover to its initial position, said cover being halted in the latter by said brake means; and spring means connected to said cover to urge said cover towards its initial position and thereby decrease deceleration of the motion imparted to said cover by said kicker.

GLENN M. PORTER.

REFERENCES CITED

The following references are of record in the file of this patent:

UNITED STATES PATENTS

| Number | Name | Date |
| --- | --- | --- |
| 1,557,350 | Stebler | Oct. 13, 1925 |
| 1,917,709 | Griffith et al. | July 11, 1933 |
| 1,973,767 | Kimball et al. | Sept. 18, 1934 |
| 2,344,664 | Adams | Mar. 21, 1944 |